Sept. 29, 1925.

F. R. LEAKE 1,555,506

MOUNTING OF SIDE CARS OF MOTOR CYCLES

Filed June 4, 1925

Inventor
F. R. Leake
by
Langner, Parry, Card & Langner
Attys.

Patented Sept. 29, 1925.

1,555,506

UNITED STATES PATENT OFFICE.

FRANK REGINALD LEAKE, OF NORTH HOBART, TASMANIA, AUSTRALIA.

MOUNTING OF SIDE CARS OF MOTOR CYCLES.

Application filed June 4, 1925. Serial No. 34,947.

*To all whom it may concern:*

Be it known that I, FRANK REGINALD LEAKE, of North Hobart, in the State of Tasmania, Commonwealth of Australia, a subject of the King of Great Britain, have invented certain new and useful Improvements Relating to the Mounting of Side Cars of Motor Cycles, of which the following is a specification.

This invention refers to the mounting of side cars of motor cycles and provides means that make for safety in case of vital parts breaking and for the comfort of the passenger occupying the car.

At the present time side cars rest upon springs that are secured to the axle bar that is attached to the frame of a motor cycle and at the outer part carries the road wheel. The chassis or frame of the side car consists of a bar attached to the forward part of the cycle and connected rearwardly to the axle bar through the outer spring. This draft bar is more or less diagonally placed and another bar is connected to the cycle frame near the saddle and at its outer end to the draft bar. It has further been suggested that the outer spring supporting the car body be superposed upon a third spring so as to roll thereon as the body rocks longitudinally.

In the present invention, the car body is held on springs secured to the axle bar with a main draft bar attached to the forward part of the cycle and taken rearwardly in a line parallel to the body springs through a safety block on the axle bar. Below the safety block and secured thereto is a semi-elliptic spring secured at its waist to the block and at its tips to the draft bar. The position of the block and the extra spring is at the outer extremity of the axle bar beyond the outer body spring and the block carries at its upper end the stub axle of the road wheel. The second draft bar is secured to the cycle frame at or near to the saddle and is taken under the main axle bar to a point on the parallel part of the main draft bar between the safety block and the rearward spring connection with the bar where it is secured.

But in order to fully understand the nature of the invention reference is made to the accompanying drawings, in which—

Figure 1:
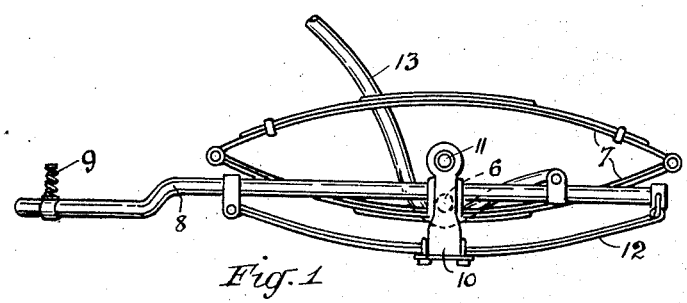
Figure 2:
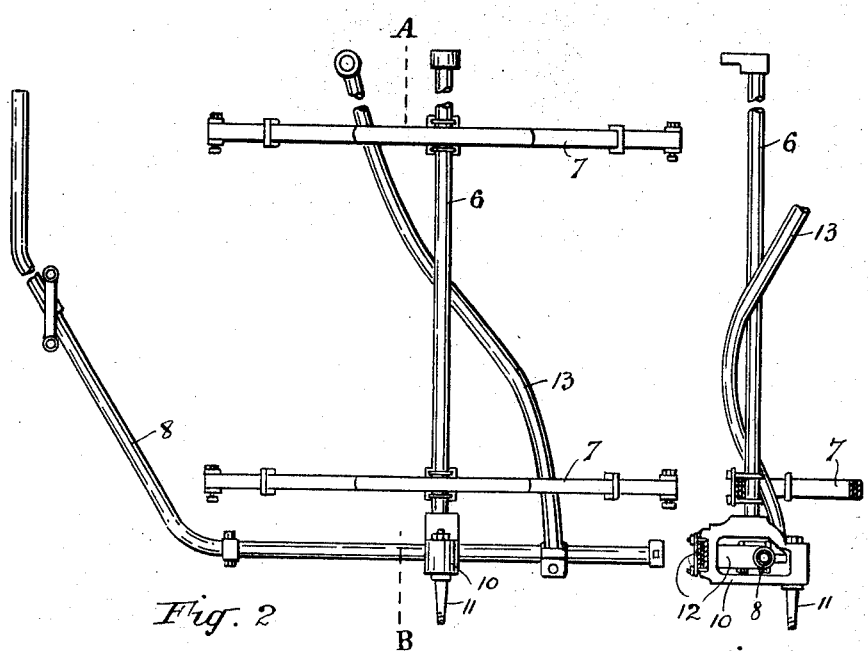

Fig. 1 is a side elevation of the chassis frame,

Fig. 2 a plan of the same, and

Figure 3:
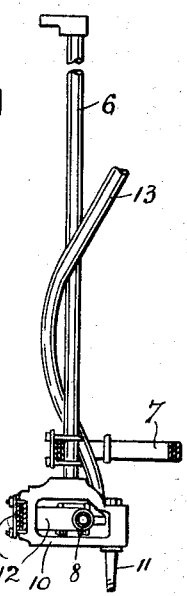

Fig. 3 a front sectional elevation on the line A—B of Fig. 2.

Figure 4:
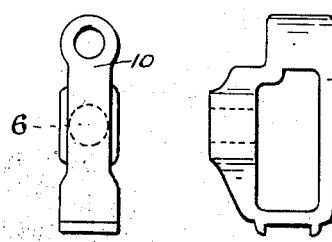

Fig. 4 is an enlarged view in front elevation of the safety block, and

Figure 5:
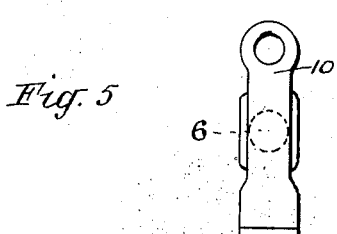

Fig. 5 a side elevation of the same.

The axle bar 6 carries the car body springs 7 and is connected into the motor cycle frame in any convenient way. The draft bar 8 is attached to the forward end of the cycle frame and supports on the usual cushion springs 9 the forward end of the car body. It is then taken rearwards and bent parallel to the springs 7 before being passed through the safety block 10 that is hollow or slotted and mounted on the outer end of the axle bar 6. The block 10 is deep enough to extend well below the springs 7 and at its upper end is fitted with a stub axle 11 on which the road wheel is held. Its lower part is channelled to receive the waist of a spring 12 that is bolted thereto and connected at its tips to the draft bar 8. This spring 12, which may be called the wheel spring, receives the road shocks as it is quite separate and apart from the springs 7, and it tends to relieve the latter by absorbing shocks before the axle bar can be sufficiently affected thereby to convey its movements to the body springs.

The other draft bar 13 is connected into the cycle frame near to the saddle and is taken below the axle bar 6 to its attachment with the main draft bar 8.

The bar 8 may be housed in the safety member 10 with a sliding block that nicely fits in the slot or opening in the member 10. This mode of housing the draft bar is desirable as any tendency to warping of the wheel spring 12 is thus minimized if not avoided. I also recommend that the sliding block be fixed on the bar 8 and that it be fitted with a flange or lug that is adapted to slide on the exterior face of the safety member to prevent any movement of the bar 8 and sliding block in said safety member except in a vertical plane.

It will thus be seen that the draft from the motor cycle is conveyed to the side car axle through the several parts and connections while the main bar 8 passes through the safety block 10 on which the road wheel is free to revolve. This arrangement is advantageous and is a factor of safety in case of breakage of essential parts. Should, for instance, the wheel spring break, the fall of the draft bar 8 would be limited by the depth of the slot in the block 10. In case the main draft bar should break at its point of connection with the cycle frame the tendency would be for the side car body to fall by the nose, but its forward tip would be shortened by the bar 13 contacting with the axle bar and by the movement of the bar 8 upwards being limited by the slot aforesaid.

Thus, the block 10 will be found useful in rendering the side car comfortable to ride in and safer than is at present the case.

Having now described my invention what I claim as new and desire to secure by Letters Patent is:—

1. In a side car of the kind indicated, a side car chassis, side car body springs, a side car axle, a slotted block on the side car axle, a chassis main draft bar connected to the forward part of the motor cycle and passing through the slot in the block in a line parallel with the body springs, a second draft bar from the cycle frame connected to the main draft bar at a point rearwardly of the slotted block, a road wheel, a stub axle on the block, and a road wheel on the stub axle.

2. In a side car of the kind indicated, a side car chassis, a side car axle, a slotted block on the outer end of the side car axle, a chassis main draft bar passing through the slot in the block, means for staying the chassis frame, a stub axle on the block, a road wheel on the stub axle, a channel in the under face side of the block, and a wheel spring housed in the channel and having its ends connected to the main draft bar.

3. A side car of the kind indicated, comprising, a side car chassis, body springs, an axle, a slotted block on the axle mounted at a point outside of and beyond the body springs, and a main draft bar for the chassis frame housed in the block.

4. In a side car of the kind indicated, a chassis frame, an axle, a main draft bar, a slotted block on the outer end of the axle, a chassis main draft bar passing through the slot in the slotted block, a block mounted on the draft bar and positioned in the slotted block to slide vertically therein, means for staying the chassis frame, and a wheel spring housed in the lower part of the slotted block and secured at its ends to the main draft bar.

In testimony whereof I have signed my name to this specification.

FRANK REGINALD LEAKE.